United States Patent
Lee et al.

(10) Patent No.: US 12,418,413 B2
(45) Date of Patent: Sep. 16, 2025

(54) APPARATUS AND METHOD FOR VALIDATING DATA

(71) Applicant: ELECTRONICS AND TELECOMMUNICATIONS RESEARCH INSTITUTE, Daejeon (KR)

(72) Inventors: Young-Kyung Lee, Daejeon (KR); Ju-Young Kim, Daejeon (KR); Sung-Jin Yu, Daejeon (KR); Nam-Su Jho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 161 days.

(21) Appl. No.: 18/528,172

(22) Filed: Dec. 4, 2023

(65) Prior Publication Data

US 2024/0187226 A1 Jun. 6, 2024

(30) Foreign Application Priority Data

Dec. 5, 2022 (KR) .......... 10-2022-0167804
Oct. 19, 2023 (KR) .......... 10-2023-0140040

(51) Int. Cl.
*H04L 9/08* (2006.01)
*G06F 21/60* (2013.01)
*H04L 9/32* (2006.01)

(52) U.S. Cl.
CPC .......... *H04L 9/088* (2013.01); *G06F 21/60* (2013.01); *H04L 9/3263* (2013.01)

(58) Field of Classification Search
CPC ..... H04L 9/088; H04L 9/3263; H04L 9/3218; H04L 9/50; G06F 21/60
See application file for complete search history.

(56) References Cited

U.S. PATENT DOCUMENTS

| 2016/0105414 A1* | 4/2016 | Bringer | H04L 9/3247 713/168 |
| 2018/0270065 A1* | 9/2018 | Brown | H04L 9/3239 |
| 2019/0229919 A1* | 7/2019 | Gurkan | H04L 9/0869 |

(Continued)

FOREIGN PATENT DOCUMENTS

| CN | 110945549 A | * | 3/2020 | .......... H04L 9/0637 |
| CN | 109450645 B | * | 4/2021 | .......... H04L 9/3263 |

(Continued)

OTHER PUBLICATIONS

Yan Li et al., "Toward Decentralized Fair Data Trading Based on Blockchain", IEEE Network, Sep. 30, 2020.

*Primary Examiner* — Shahriar Zarrineh

(57) ABSTRACT

Disclosed herein is an apparatus and method for verifying data validity. The method performed by the apparatus includes generating a zero knowledge proof key pair and a certificate using a key generation algorithm of zero knowledge proof in response to a request from a first device to issue a key, generating a verification certificate by verifying validity and quality of data after receiving the data and a verification request from the first device, and performing, by the first device, zero knowledge proof for the data in response to a proof request from a second device that buys the data possessed by the first device.

6 Claims, 5 Drawing Sheets

$$(sk, vk) \leftarrow Sign.Keygen(\lambda)$$
$$proof \leftarrow Sign.Sig(sk, msg)$$
$$1 \text{ or } 0 \leftarrow Sign.Vrfy(vk, msg)$$

$$(sk, vk) \leftarrow ZKP.Keygen(\lambda)$$
$$proof \leftarrow ZKP.Prove(sk, stmt, wit)$$
$$1 \text{ or } 0 \leftarrow ZKP.Vrfy(vk, stmt)$$

(56) References Cited

U.S. PATENT DOCUMENTS

| | | | |
|---|---|---|---|
| 2020/0034834 A1* | 1/2020 | Li | G06Q 20/389 |
| 2020/0244435 A1* | 7/2020 | Shpurov | G06F 21/64 |
| 2020/0328894 A1 | 10/2020 | Baker | |
| 2021/0027294 A1* | 1/2021 | Trevethan | G06Q 40/04 |
| 2021/0297255 A1* | 9/2021 | Wan | H04L 63/0442 |
| 2021/0406878 A1 | 12/2021 | Ferenczi et al. | |

FOREIGN PATENT DOCUMENTS

| | | | | |
|---|---|---|---|---|
| CN | 112600677 A | * | 4/2021 | H04L 67/1097 |
| CN | 112738177 A | * | 4/2021 | H04L 9/50 |
| CN | 113014392 A | * | 6/2021 | H04L 9/3221 |
| CN | 114553437 A | * | 5/2022 | H04L 9/3221 |
| CN | 115564434 A | * | 1/2023 | G06Q 20/38215 |
| JP | 2022510790 A | * | 1/2022 | H04L 9/50 |
| KR | 10-2020-0115718 A | | 10/2020 | |
| KR | 10-2022-0095957 A | | 7/2022 | |
| WO | WO-2020063186 A1 | * | 4/2020 | G06F 21/6245 |
| WO | WO-2022247910 A1 | * | 12/2022 | G06F 21/64 |

\* cited by examiner $$(sk, vk) \leftarrow Sign.Keygen(\lambda)$$
$$proof \leftarrow Sign.Sig(sk, msg)$$
$$1 \text{ or } 0 \leftarrow Sign.Vrfy(vk, msg)$$

$$(sk, vk) \leftarrow ZKP.Keygen(\lambda)$$
$$proof \leftarrow ZKP.Prove(sk, stmt, wit)$$
$$1 \text{ or } 0 \leftarrow ZKP.Vrfy(vk, stmt)$$

APPARATUS AND METHOD FOR VALIDATING DATA

CROSS REFERENCE TO RELATED APPLICATIONS

This application claims the benefit of Korean Patent Applications No. 10-2022-0167804, filed Dec. 5, 2022, and No. 10-2023-0140040, filed Oct. 19, 2023, which are hereby incorporated by reference in their entireties into this application.

BACKGROUND OF THE INVENTION

1. Technical Field

The present disclosure relates to technology for validating data in a data trading environment.

2. Description of the Related Art

The fourth industrial revolution has led to an increase in data production and a significant rise in the value of data, and a data trading market is also significantly growing. However, the current data trading markets have a centralized structure, which may cause various problems, such as a single point of failure in a data trading server, personal information leakage, and the like.

In order to solve the above problems and to protect individual data sovereignty, which is one of the purposes of General Data Protection Regulation (GDPR) in Europe, 'MyData' in South Korea, and the like, a decentralized data trading platform is required.

When a blockchain-based decentralized data trading platform is used, one-to-one transactions using a smart contract may be performed without the need to depend on a third party. However, considering the fact that data can be easily reproduced and altered through replication and falsification, it is difficult to establish a reliable transaction system that ensures a high level of validity and quality of data without the help of third parties.

In order to activate data trading, it is essential to validate data and ensure the quality of the data, but it is difficult to guarantee reliability in a decentralized data trading platform having no central authority to perform these tasks. If the platform itself solely performs data validation and quality assurance, it defeats the decentralization purpose, and if such tasks are entrusted to individuals participating in transactions, which may decrease reliability.

Meanwhile, Korean Patent Application Publication No. 10-2022-0095957, titled "Blockchain-based secure and trusted data trading method and data trading platform provision system", discloses a blockchain-based decentralized data trading platform provision system capable of making a profit through data in a secure and reliable environment by applying blockchain technology to data trading markets and data-based digital economy.

SUMMARY OF THE INVENTION

An object of the present disclosure is to provide a reliable data trading service in response to the growing importance of decentralized data trading platforms.

Another object of the present disclosure is to provide convenience and security by enabling buyers to validate and trade data without involvement of a verifier when the data is traded, thereby enhancing the reliability of a decentralized data trading service.

In order to accomplish the above objects, a method for verifying data validity, performed by an apparatus for verifying data validity, according to an embodiment of the present disclosure includes generating a zero knowledge proof key pair and a certificate using a key generation algorithm of zero knowledge proof in response to a request from a first device to issue a key, generating a verification certificate by verifying validity and quality of data after receiving the data and a verification request from the first device, and performing, by the first device, zero knowledge proof for the data in response to a proof request from a second device that buys the data possessed by the first device.

Here, generating the certificate may comprise generating the certificate by signing the ID of the first device and a verification key as a message and transmitting the zero knowledge proof key pair and the certificate to the first device.

Here, generating the verification certificate may comprise generating the verification certificate by signing a hash value of a combination of a verification result, acquired by verifying the validity and quality of the data, and the data.

Here, the zero knowledge proof may prove possession of the data by generating a witness from data used to calculate the hash value using a preset proof algorithm.

Here, performing the zero knowledge proof may comprise confirming, by the second device, that the zero knowledge proof is performed by the first device using the original data verified through the zero knowledge proof.

Also, in order to accomplish the above objects, an apparatus for verifying data validity according to an embodiment of the present disclosure includes one or more processors and memory for storing at least one program executed by the one or more processors. The at least one program generates a zero knowledge proof key pair and a certificate using a key generation algorithm of zero knowledge proof in response to a request from a first device to issue a key and generates a verification certificate by receiving data and a verification request from the first device and verifying validity and quality of the data, and the first device performs zero knowledge proof for the data in response to a proof request from a second device that buys the data possessed by the first device.

Here, the at least one program may generate the certificate by signing the ID of the first device and a verification key as a message and transmit the zero knowledge proof key pair and the certificate to the first device.

Here, the at least one program may generate the verification certificate by signing a hash value of a combination of a verification result, acquired by verifying the validity and quality of the data, and the data.

Here, the zero knowledge proof may prove possession of the data by generating a witness from data used to calculate the hash value using a preset proof algorithm.

Here, the second device may confirm that the zero knowledge proof is performed by the first device using the original data verified through the zero knowledge proof.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figures 1, 2:
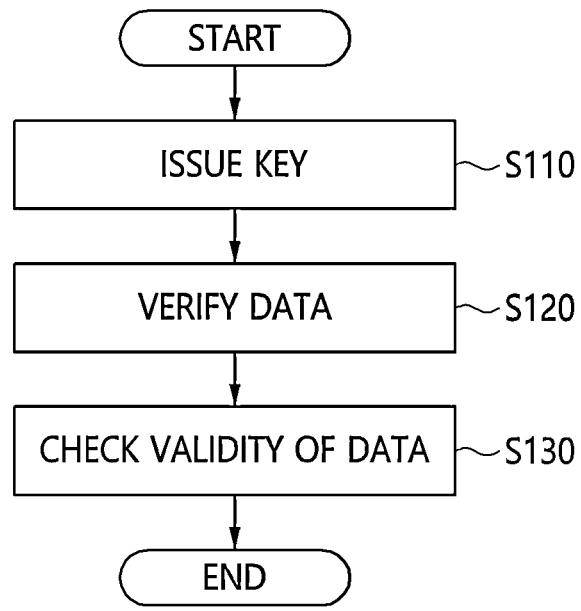
FIG. 1 is a view illustrating the configurations of a signature algorithm and a zero knowledge proof algorithm according to an embodiment of the present disclosure.
FIG. 2 is a flowchart illustrating a method for verifying validity of data according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

FIG. 1 is a view illustrating the configurations of a signature algorithm and a zero knowledge proof algorithm according to an embodiment of the present disclosure.

In the present disclosure, there are three entities having different purposes, that is, a seller, a verifier, and a buyer. The seller, such as a personal mobile device, a smart vehicle, a smart home, or the like, has a sales purpose such as producing and selling data, collecting and selling various kinds of data, or the like. The verifier may be an individual or company that develops and sells a data verification service by participating in a trading platform. The buyer is an entity that intends to buy actual data, and may buy data based on the verification service of the trusted verifier, without concern about the reliability of the seller. The present disclosure may be designed such that a trusted data transaction between the seller and the buyer is realized without involvement of the verifier after the verifier initially verifies data.

Referring to FIG. 1, it can be seen that the configurations of a signature algorithm and a zero knowledge proof algorithm used in the present disclosure are illustrated. The signature algorithm includes a key generation algorithm (Keygen), a signature algorithm (Sig), and a Verification algorithm (Vrfy), and may be used when a certificate and a verification certificate are issued. The zero knowledge proof algorithm includes a key generation algorithm (Keygen), a proof algorithm (Prove), and a verification algorithm (Vrfy), and may be used when a seller generates a proof using data verified by a verifier or when a buyer confirms the validity of the data based on a verification certificate without acquiring information about the data.

Figure 3:
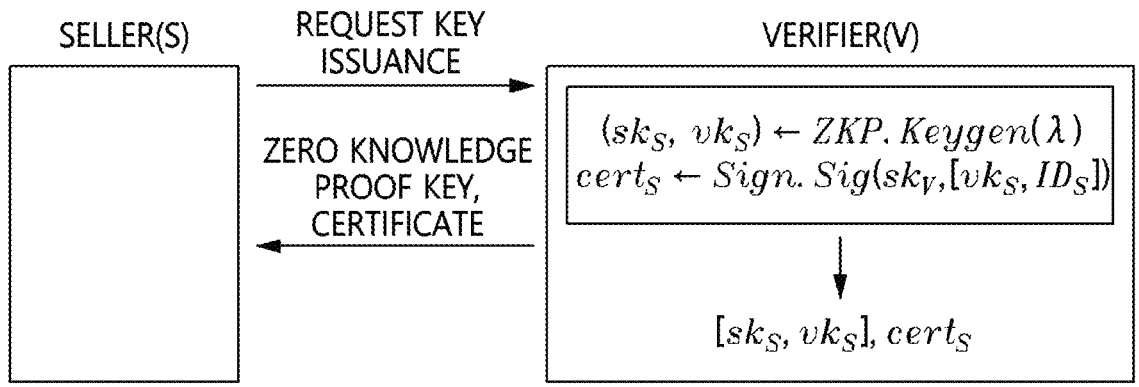
FIG. 3 is a view illustrating a key issuance process according to an embodiment of the present disclosure.
Figure 4:
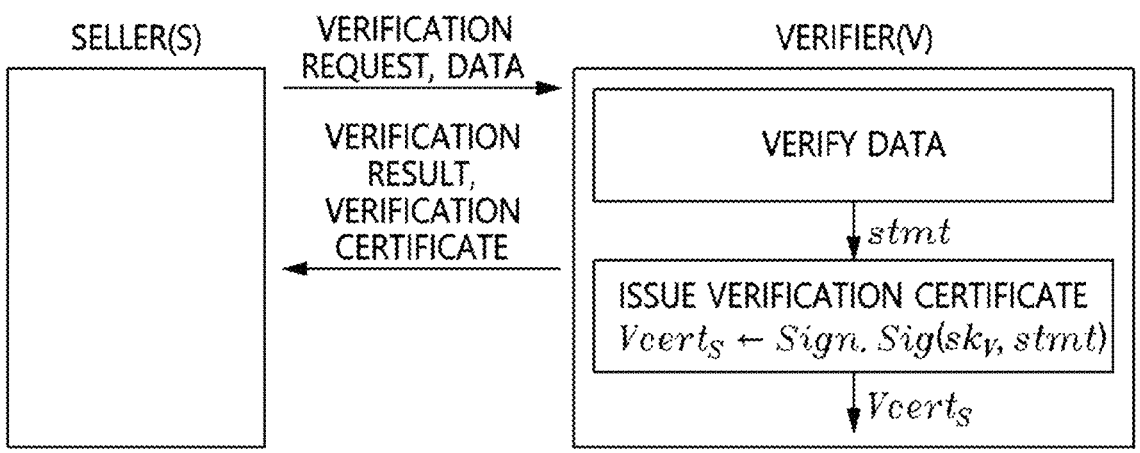
FIG. 4 is a view illustrating a data verification process according to an embodiment of the present disclosure.
Figure 5:
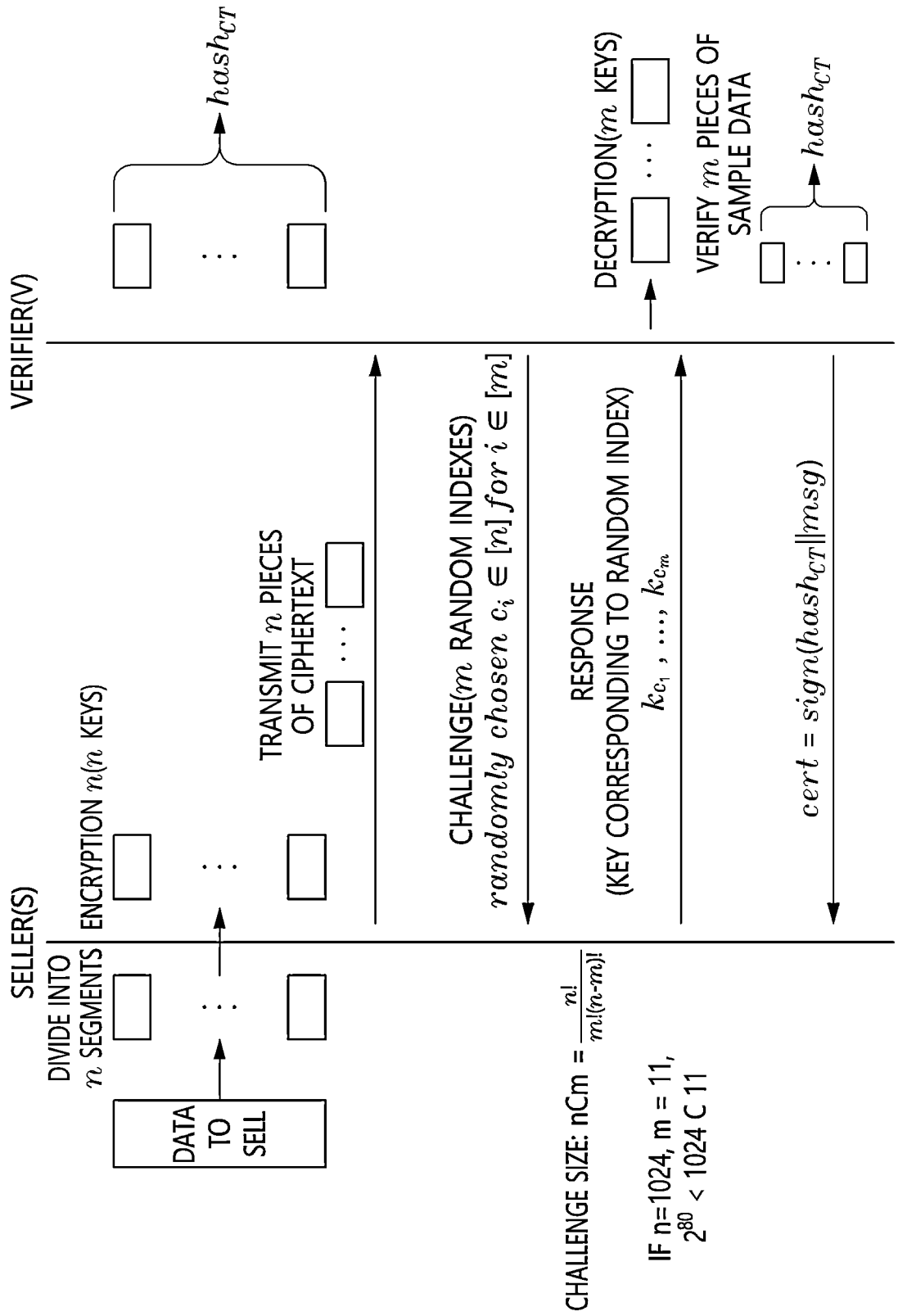
FIG. 5 is a view illustrating a quality test process using a challenge-and-response method according to an embodiment of the present disclosure.
Figure 6:
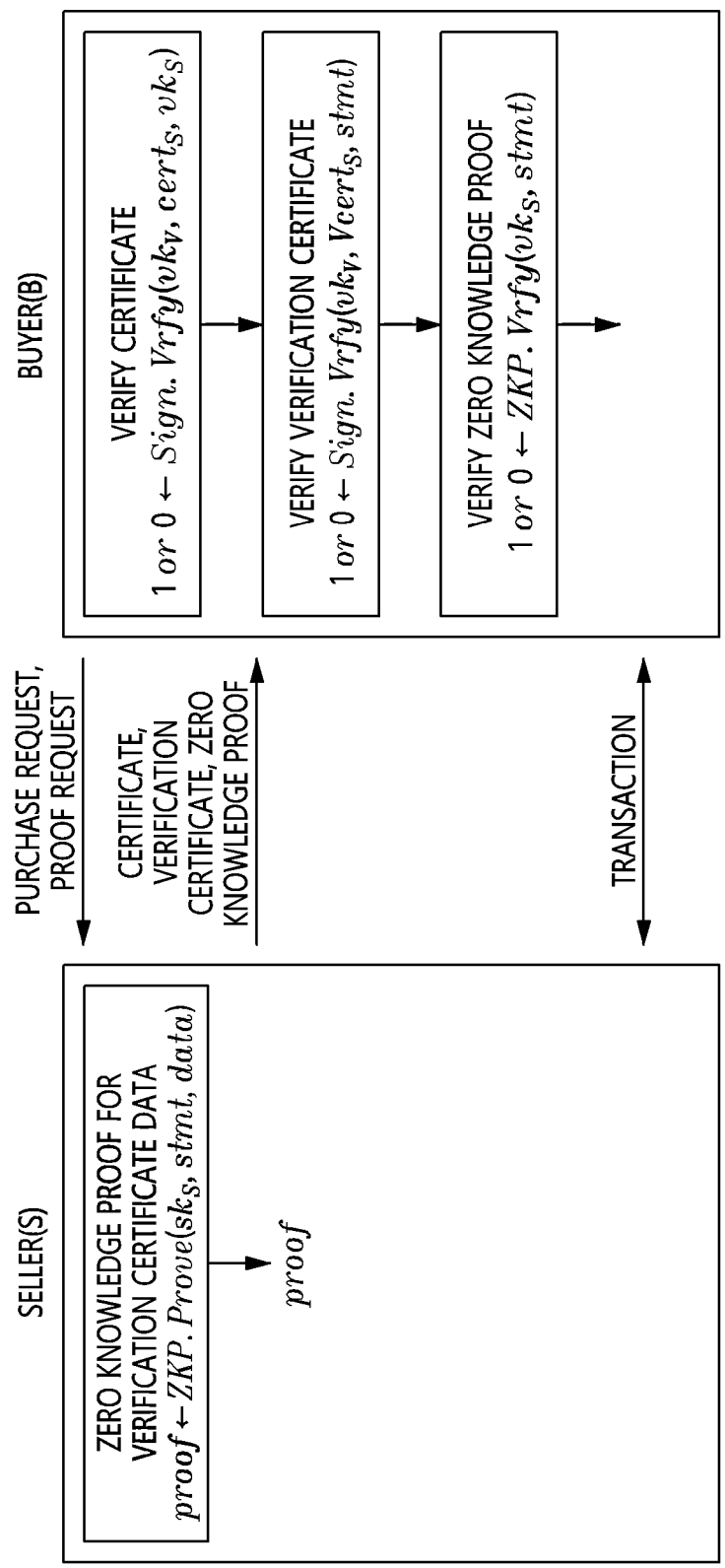
FIG. 6 is a view illustrating a data validity checking process according to an embodiment of the present disclosure.

FIG. 2 is a flowchart illustrating a method for verifying data validity according to an embodiment of the present disclosure. FIG. 3 is a view illustrating a key issuance process according to an embodiment of the present disclosure. FIG. 4 is a view illustrating a data verification process according to an embodiment of the present disclosure. FIG. 5 is a view illustrating a quality test process using a challenge-and-response method according to an embodiment of the present disclosure. FIG. 6 is a view illustrating a data validity checking process according to an embodiment of the present disclosure.

Referring to FIG. 2, in the method for verifying data validity according to an embodiment of the present disclosure, first, a key issuance procedure may be performed at step S110.

Referring to FIG. 3, it can be seen that an example of a key issuance process at step S110 is illustrated in detail.

At step S110, a seller (a first device) may request a verifier (an apparatus for verifying data validity) to issue a key.

Here, at step S110, the verifier may generate a pair comprising a secret key $sk_s$ and a verification key $vk_s$ using the key generation algorithm of zero knowledge proof.

Here, at step S110, the verifier may generate a certificate certs by signing the ID of the seller (IDs) and the verification key as a message and transmit the zero knowledge proof key pair and the certificate to the seller.

Also, in the method for verifying data validity according to an embodiment of the present disclosure, data may be verified at step S120.

Referring to FIG. 4, it can be seen that an example of a data verification process at step S120 is illustrated in detail.

At step S120, the seller may transmit data to be verified and a verification request containing verification content to the verifier.

Here, at step S120, the verifier may verify the validity and quality of the data.

Here, at step S120, the verifier may generate a verification certificate $Vcert_s$ by signing the hash value of a combination of a verification result and the data and transmit the verification certificate to the seller along with the verification result.

If it is intended to prevent the data from being exposed to the verifier, the data verification process is divided into a full verification stage, a sample verification stage, and a condition verification stage depending on the characteristics of the data, and only selected verification stage may be performed.

In the case of full verification, a seller gives permission to read the entire data to a verifier, so the verifier may perform sophisticated verification and a quality test based on the permission to read the entire data.

Sample verification may be selected when a seller is unwilling to disclose the entire data to a verifier.

Referring to FIG. 5, it can be seen that a process in which a verifier performs verification and a quality test by reading sample data selected from among the entire data using a challenge-and-response method is illustrated. Because verification is performed using the samples without reading the entire data, reliability may be slightly decreased, but adjustment of the size of a challenge in the challenge-and-response method makes it difficult for a seller to falsify the validity of the data using the samples.

Condition verification may be used when whether a certain condition is satisfied is verified without exposing data. For example, it is possible to prove that the condition 'data falls within a certain range' is satisfied using a range zero-knowledge proof (e.g., a bulletproof), without exposing the data to a verifier. In the case of condition verification, a seller may directly give the proof to a buyer rather than the verifier. However, when the verification method is complicated and is difficult to understand, because a method in which a verifier verifies data and a buyer merely checks a verification certificate is convenient for the buyer, condition verification using this method may be selected.

Also, in the method for verifying data validity according to an embodiment of the present disclosure, the validity of data may be checked at step S130.

Referring to FIG. 6, it can be seen that an example of a data validity checking process at step S130 is illustrated in detail.

At step S130, first, a buyer (a second device) may transmit a purchase request and a proof request to the seller in order to buy data.

Here, at step S130, the seller may generate a proof of zero knowledge proof by generating a witness from the data used for calculation of the hash value using the proof algorithm (Prove) of the preset zero knowledge proof. Here, in the case of sample verification or condition verification, the zero knowledge proof is configured such that a hash value is generated using ciphertext and a witness is generated from the key of the ciphertext, whereby possession of the data may be proved.

Here, at step S130, the seller may transmit the certificate $cert_v$, the verification certificate $Vcert_v$, and the proof of the zero knowledge proof to the buyer.

Here, at step S130, the buyer may verify (Vrfy) the certificate, the verification certificate, and the proof.

Here, at step S130, the buyer may confirm that the zero knowledge proof is performed by the seller using the original data verified by the verifier through the zero knowledge proof.

Here, at step S130, the buyer may perform data trading through a smart contract with the seller.

Figure 7:
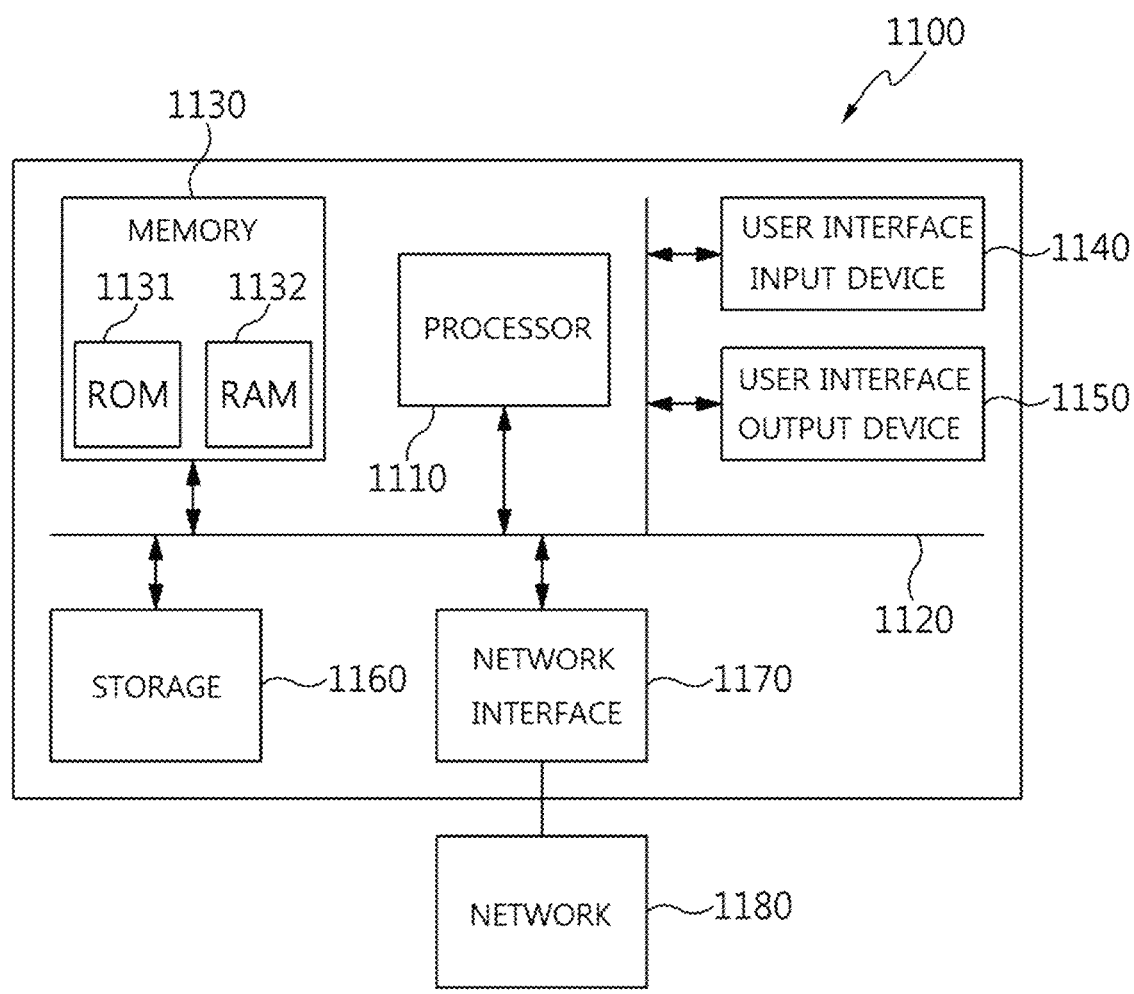
FIG. 7 is a view illustrating a computer system according to an embodiment of the present disclosure.

FIG. 7 is a block diagram illustrating a computer system according to an embodiment of the present disclosure.

Referring to FIG. 7, the seller, the buyer, and the verifier according to an embodiment of the present disclosure may be implemented in a computer system 1100 including a computer-readable recording medium. As illustrated in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for verifying data validity according to an embodiment of the present disclosure may include one or more processors 1110 and memory 1130 for storing at least one program executed by the one or more processors 1110. The at least one program generates a zero knowledge proof key pair and a certificate using a key generation algorithm of zero knowledge proof in response to a request from a first device to issue a key and generates a verification certificate by receiving data and a verification request from the first device and verifying the validity and quality of the data. The first device performs zero knowledge proof for the data in response to a proof request from a second device that buys the data possessed by the first device.

Here, the at least one program may generate the certificate by signing the ID of the first device and a verification key as a message and transmit the zero knowledge proof key pair and the certificate to the first device.

Here, the at least one program may generate the verification certificate by signing the hash value of a combination of a verification result, acquired by verifying the validity and quality of the data, and the data.

Here, the zero knowledge proof may prove possession of the data by generating a witness from data used to calculate the hash value using a preset proof algorithm.

Here, the second device may confirm that the zero knowledge proof is performed by the first device using the original data verified through the zero knowledge proof.

In the present disclosure, a verifier, which is a third party, performs various types of complicated data verification, such as checking data replication, data falsification, and data quality, and a seller may prove only the validity of the verification result and the original data using zero knowledge proof. Accordingly, there is no restriction on the configuration of validity verification and a quality test performed by the verifier, and the content of zero knowledge proof may be efficiently configured.

Particularly in a decentralized system, the verifier may professionally verify the validity and quality of data as a participant in the platform, rather than a centralized party, and may contribute to improvement of confidence as an individual participating entity and improvement of the reliability of the overall trading platform. The verifier may be rewarded with verification fees, and may further improve the confidence in the platform using a deposit, insurance, and the like. Also, the platform entrusts security tasks, such as strengthening the requirements for participation in the platform, a security test, or the like for enhancing the reliability, to a participating entity corresponding to only the verifier, thereby efficiently managing the reliability.

The present disclosure may provide a reliable data trading service in response to the growing importance of decentralized data trading platforms.

Also, the present disclosure may provide convenience and security by enabling buyers to validate and trade data without involvement of a verifier, thereby enhancing the reliability of a decentralized data trading service.

As described above, the apparatus and method for verifying data validity according to the present disclosure are not limitedly applied to the configurations and operations of the above-described embodiments, but all or some of the embodiments may be selectively combined and configured, so the embodiments may be modified in various ways.

What is claimed is:

1. A method for verifying data validity, performed by an apparatus for verifying data validity, comprising:
   generating a zero knowledge proof key pair and a certificate using a key generation algorithm of zero knowledge proof in response to a request from a first device to issue a key:
   wherein generating the certificate comprises generating the certificate by signing an ID of the first device and a verification key as a message and transmitting the zero knowledge proof key pair and the certificate to the first device;

receiving data and a verification request from the first device and verifying validity and quality of the data, thereby generating a verification certificate; and performing, by the first device,
wherein generating the verification certificate comprises generating the verification certificate by signing a hash value of a combination of a verification result, acquired by verifying the validity and quality of the data, and the data;
zero knowledge proof for the data in response to a proof request from a second device that buys the data possessed by the first device.

2. The method of claim 1, wherein the zero knowledge proof proves possession of the data by generating a witness from data used to calculate the hash value using a preset proof algorithm.

3. The method of claim 2, wherein performing the zero knowledge proof comprises confirming, by the second device, that the zero knowledge proof is performed by the first device using the original data verified through the zero knowledge proof.

4. An apparatus for verifying data validity, comprising:
one or more processors; and
memory for storing at least one program executed by the one or more processors, wherein
the at least one program generates a zero knowledge proof key pair and a certificate using a key generation algorithm of zero knowledge proof in response to a request from a first device to issue a key and generates a verification certificate by receiving data and a verification request from the first device and verifying validity and quality of the data, and
wherein generating the certificate comprises generating the certificate by signing an ID of the first device and a verification key as a message and transmitting the zero knowledge proof key pair and the certificate to the first device;
wherein generating the verification certificate comprises generating the verification certificate by signing a hash value of a combination of a verification result, acquired by verifying the validity and quality of the data, and the data;
the first device performs zero knowledge proof for the data in response to a proof request from a second device that buys the data possessed by the first device.

5. The apparatus of claim 4, wherein the zero knowledge proof proves possession of the data by generating a witness from data used to calculate the hash value using a preset proof algorithm.

6. The apparatus of claim 5, wherein the second device confirms that the zero knowledge proof is performed by the first device using the original data verified through the zero knowledge proof.

* * * * *